(No Model.)

E. F. WILLIAMS.
INERTIA RECORDING MECHANISM FOR STEAM ENGINES.

No. 307,612. Patented Nov. 4, 1884.

Witnesses
S. N. Piper
E. B. Pratt

Inventor
Edwin Franklin Williams
by R. H. Eddy atty.

United States Patent Office.

EDWIN FRANKLIN WILLIAMS, OF PHILADELPHIA, PA., ASSIGNOR TO THE CROSBY STEAM GAGE AND VALVE COMPANY, OF BOSTON, MASS.

INERTIA-RECORDING MECHANISM FOR STEAM-ENGINES.

SPECIFICATION forming part of Letters Patent No. 307,612, dated November 4, 1884.

Application filed May 26, 1884. (No model.)

*To all whom it may concern:*

Be it known that I, EDWIN FRANKLIN WILLIAMS, of Philadelphia, in the county of Philadelphia, of the State of Pennsylvania, have invented a new and useful Improvement in Inertia-Recording Mechanism, such being for indicating the inertia of moving parts of a steam-engine; and I do hereby declare the same to be described in the following specification and represented in the accompanying drawings, of which—

Figure 1:
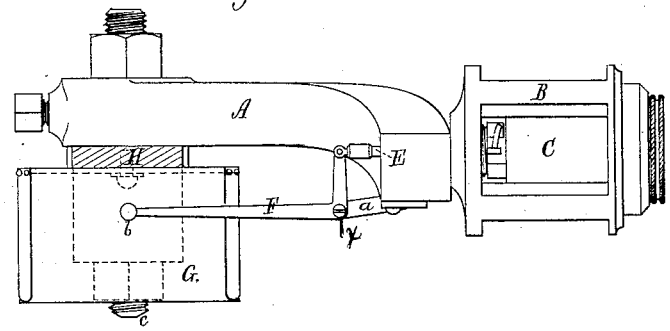
Figure 3:
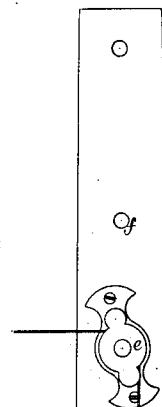
Figure 2:
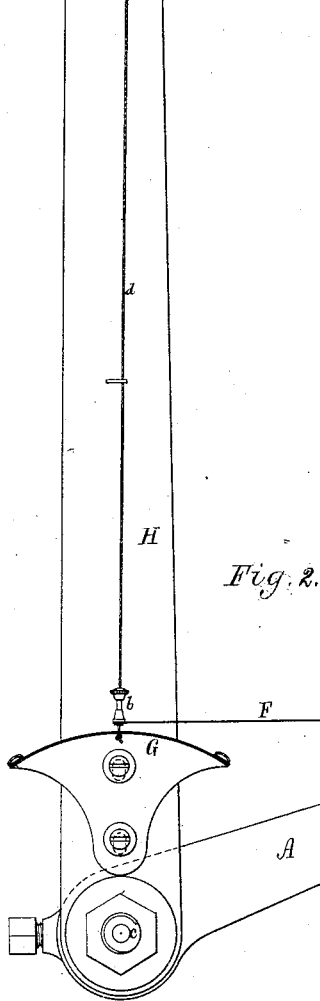

Figure 1 is a top view, Fig. 2 a front elevation, and Fig. 3 a longitudinal section, of an inertia indicator or register containing my invention, the nature of which is defined in the claim hereinafter presented.

The reciprocating parts of a steam-engine are put in motion and theoretically brought to rest twice for every revolution of the crank, and there is due to this acceleration and retardation a certain inertia force, which the indicator or register hereinbefore described is intended to measure. It does not indicate the actual forces of the reciprocating parts, but the force exerted by a known weight whose movements are coincident with those of the piston of the engine or with those of some other part or parts having corresponding movements. The actual force or inertia of this known weight is at any part of the stroke of the piston recorded upon paper by a pencil actuated by the weight—in other words, there is drawn a diagram from or by which the forces of inertia throughout the said stroke, or at any point thereof, may be measured or determined, the paper being properly scaled to indicate by the diagram the inertia forces. The proportion the indicator movable weight bears to that of the weight of the part or parts whose forces of inertia it may be desirable to ascertain being known, it becomes an easy matter to determine such forces, for the inertia of the weight indicated by the extent of movement of the pencil away from a neutral line is to the inertia of the reciprocating parts of the engine as the weight of the weight is to that of such reciprocating parts. Therefore, if these weights are in the proportion of one to twenty, and the movement of the pencil away from the neutral line be one inch, for instance, for an inertia force of five hundred pounds of the weight, we shall know that such a movement of the pencil will indicate ten thousand pounds as the measure of the inertia of the reciprocating parts of the engine. There being on the paper a proper scale to indicate any such movement of the pencil, the amount of inertia of the weight due to any degree of movement of the pencil will be to the five hundred pounds as the degree of movement of the pencil is to one inch. From this it will be seen that by the curved line traced by the pencil on the paper we can ascertain the inertia forces of the reciprocating parts of the engine at any part or parts of the stroke.

In the drawings, A denotes an arm for supporting the operative parts of the indicator. There projects from the arm a case, B, within which is a cylindrical weight, C, which is adapted to slide lengthwise within the case. A spiral spring, D, arranged within a chamber in the weight, is attached at one end of it to the weight and at the opposite end to the case. A spindle or rod, E, fixed to the weight, extends through the spring and the case and the arm A, and is jointed to the shorter arm of a bent lever, F, which, as shown at $x$ in Fig. 1, is fulcrumed to a bracket, $a$, extending from the arm A. At or near the outer end of the longer arm of the lever F there is attached to the lever a pencil or marker, $b$, that is directly over a curved plate, G. This plate is supported by a long or pendulous lever, H, which at its lower part is jointed to the arm A. The plate G is curved with a radius whose center is in the axis of the joint-pin $c$ of the lever H. The said plate G is fixed to the said lever H, so as to be incapable of any movement relatively thereto, except a short one either toward or away from the pencil, there being attached to the plate a cord, $d$, that passes upward through a sheave, $e$, close to the fulcrum $f$ of the lever H. In practice the said lever H is fulcrumed to some suitable device that will allow the lever to swing with a pendulous motion when the arm A is reciprocated rectilinearly with and by the piston, such arm A, when the instrument is in use, being attached to the cross-head of the piston. As the piston may reciprocate, the arm A and the weight C will move forward and backward with it, the inertia of such weight causing the weight to move in the case B, and to be controlled in such movement by the spring D. In each movement the weight will carry the spindle with it and move the lever F. As the lever H will be swung by the arm A, the plate G will be reciprocated or have endwise movements imparted to it, whereby when a sheet of paper is fixed on the said plate G and the point of the pencil is in contact with such sheet a line generally more or less curved will be drawn on the sheet during the stroke of the piston. By pulling upward the cord d, the plate can be drawn upward to cause the paper to come into contact with the pencil when it may be desirable to have the latter mark the paper. The curved line so made will serve, as hereinbefore described, to register or indicate the forces of inertia of the reciprocating parts of the engine.

It will be evident that the curved plate G may be fastened to the lever H, so as to be immovable up and down relatively to the pencil; but it is preferable to have the plate so movable and to be provided with the cord, as described, to raise it.

I claim—

The inertia-indicator, substantially as described, consisting of the arm A, case B, weight C, spring D, spindle E, lever F, (provided with the pencil b,) curved plate G, and its carrying-lever H, combined essentially and to operate and for the purpose as set forth.

EDWIN FRANKLIN WILLIAMS.

Witnesses:
R. H. EDDY,
E. B. PRATT.